United States Patent [19]

Miley

[11] Patent Number: 4,725,903
[45] Date of Patent: Feb. 16, 1988

[54] SHIELD FOR VIDEO AND AUDIO CASSETTE RECORDER DOOR

[76] Inventor: Steve Miley, P.O. Box 4893, Hilo, Hi. 96720

[21] Appl. No.: 732,851

[22] Filed: May 13, 1985

[51] Int. Cl.⁴ .............................................. G11B 5/008
[52] U.S. Cl. ..................................... 360/96.5; 360/85; 369/75.1
[58] Field of Search ..................... 360/85, 95, 93, 96.5, 360/96.6; 242/197–199; 369/75.1–75.2, 77.1–77.2

[56] References Cited

U.S. PATENT DOCUMENTS

| 3,460,782 | 8/1969 | Findeisen | 360/93 X |
| 3,869,099 | 3/1975 | Inaga | 360/93 X |
| 4,327,385 | 4/1982 | Fujii | 360/96.5 |

Primary Examiner—A. J. Heinz
Attorney, Agent, or Firm—Warren F. B. Lindsley

[57] ABSTRACT

A shield is provided to cover the gap between the door of a video cassette recorder and the top of the recorder to prevent dust from passing through the gap. The shield is preferably configured as a rectangular frame and is secured to the door by POST-IT adhesive.

3 Claims, 3 Drawing Figures

SHIELD FOR VIDEO AND AUDIO CASSETTE RECORDER DOOR

BACKGROUND OF THE INVENTION

1. Field of the Invention

The instant invention relates to an improvement for doors used with video cassette recorders. More particularly, the instant invention relates to auxiliary shields used for doors of video cassette tape recorders.

2. Technical Considerations and Prior Art

Conventional video tape recorders, which are top loading, include a door in the top surface thereof which is opened to receive video tape cassettes. Generally, there is a space of approximately 3/16ths of an inch between the door and surrounding area. This gap is sufficient to allow introduction of dust into the video cassette recorder at a very critical area. The recording heads which contact video tape are positioned just beneath the door and in proximity with the space between the door and top surface of the recorder. Dust can therefore easily accumulate on the heads and on the tape as the tape moves past the heads. This dust creates "snow" on the picture tube and generally degrades the information transmitted from the tape.

To date, this problem has not been addressed and the only way to prevent this problem is to regularly dust the top of the video cassette recorder. Unfortunately, when one dusts the top of the recorder, some dust is pushed through the space into the recorder.

In view of the aforementioned problems, there is a need to protect the interior of the video tape recorders from dust and especially to protect the areas just beneath the door of a video cassette recorder from dust. In addition, there is a need to protect the tape itself from dust while the tape is within the recorder.

SUMMARY OF THE INVENTION

It is an object of the instant invention to minimize the passage of dust into the area beneath the door of a top loading video cassette tape recorder.

Upon further study of the specification and appended claims, further objects and advantages of this invention will become apparent to those skilled in the art.

The instant invention contemplates an auxiliary cover or shield in combination with the video cassette loading door of a top loading video cassette recorder, wherein the cover is retrofitted on the door and overlies a space between the door and top surface of the video cassette recorder.

In accordance with a preferred embodiment of the invention, the cover or shield is in the shape of a rectangular frame having an open area in the middle. The rectangular frame is adhered by POST-IT adhesive to the door so that it may be readily removed therefrom. The auxiliary cover or shield is open in the middle so that one may still see through the door and observe the tape being played.

BRIEF DESCRIPTION OF THE DRAWING

Various other objects, features and attendant advantages of the present invention will be more fully appreciated as the same becomes better understood when considered in connection with the accompanying drawings, in which like reference characters designate same or similar parts throughout the several views, and wherein.

DESCRIPTION OF THE PREFERRED EMBODIMENT

Figure 1:
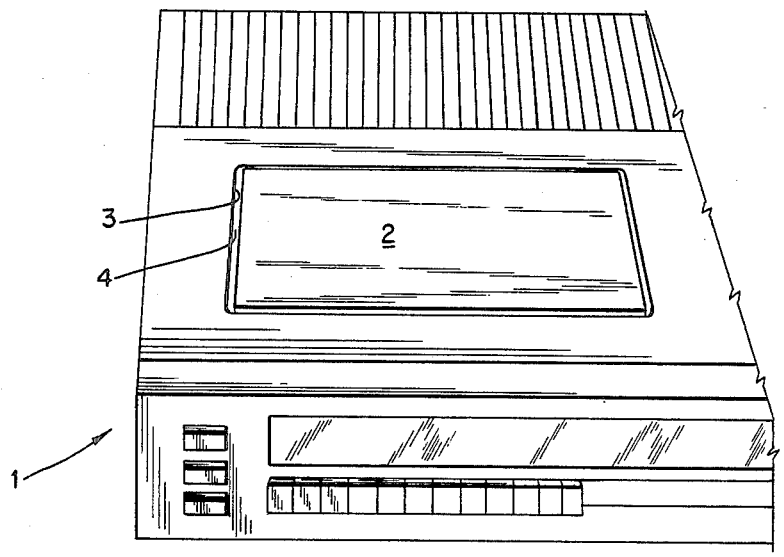
FIG. 1 is a fragmentary perspective view of a top loading video cassette recorder showing the opening therein which is sealed by a cover or shield configured in accordance with the principles of the instant invention.
Figure 2:
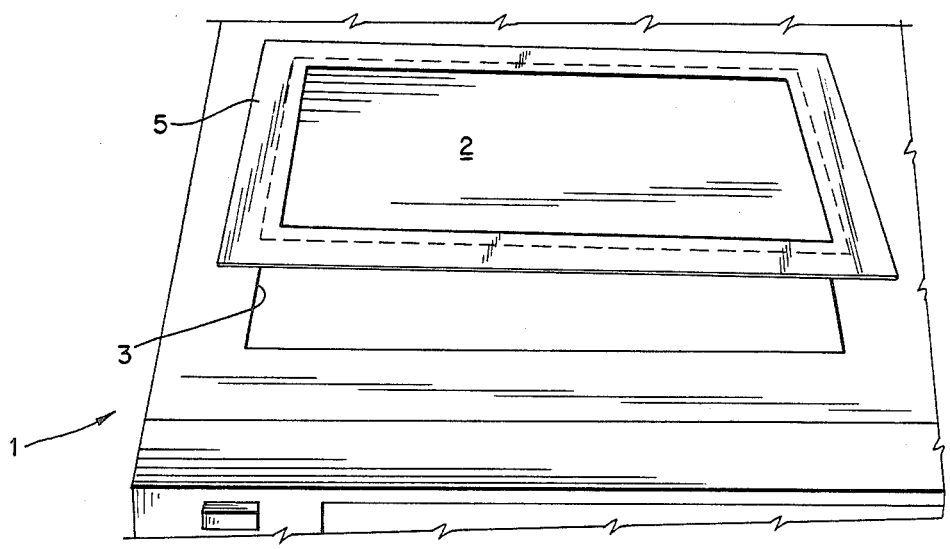
FIG. 2 is a fragmentary perspective view of a raised top door with the cover or shield of the instant invention attached.

Referring now to the drawings, FIG. 1 shows a top view of a video cassette recorder, designated generally by the numeral 1, of the top loading type. The video cassette recorder 1 has a top surface with a door 2 therein. The door 2 is lifted to insert a video cassette therein. As is readily apparent from FIG. 1, the edge of the door 2 is spaced from the edge of the top of the recorder 1 by a space 4. In those video cassette recorders on the market, the space 4 is approximately 3/16ths of an inch which allows dust to enter the recorder and accumulate on components of the recorder such as the heads and/or tape being played by the recorder. This dust causes snow in video pictures.

In accordance with the features of the instant invention, a rectangular dust shield 5 is adhered to the door 2 and lifts up and down with the door 2. The rectangular shield 5 has an open area therein so that the door 2 is not covered up. The door 2 is transparent so that one may observe the tape being played. It is not appropriate to completely cover the door. The shield 5 is wide enough to extend across the gap 4 between the door 2 and the top of the video cassette recorder 1. In a preferred embodiment, the shield is approximately one inch wide so that the outer periphery of the shield lies over the top surface of the video cassette recorder when the door 2 is closed.

Figure 3:
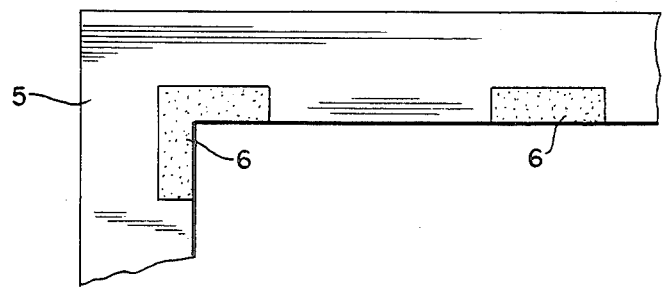
FIG. 3 is a fragmentary bottom plan view of the cover or shield of the instant invention.

As is seen in FIG. 3, adhesive patches 6 are applied to the underside of shield 5 adjacent the inner periphery of the shield. The patches 6 are preferably made of POST-IT adhesive which is manufactured by the 3-M company of St. Paul, Minn. The adhesive patches are only wide enough to extend to the periphery of the door 2 so that the shield 5 is not adhered to the top of the video cassette recorder 1 as well as to the door 2.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A top loading video and audio cassette recorder having a transparent door formed in a top surface thereof which is raised with respect to the top surface of the recorder to insert a tape therein and forming a gap between the door and the top surface of the recorder, the combination comprising:

a dust shield releasably secured to a periphery of said door and extending from said periphery of said door across and beyond said gap to said top surface of said recorder, and said shield defining an open area within the periphery of said shield through which one may observe the tape behind said door, said shield being releasably secured to said door by POST-IT type adhesive.

2. A top loading video and audio cassette recorder having a transparent door formed in a top surface thereof which is raised with respect to the top surface of the recorder to insert a tape therein and forming a gap between the door and the top surface of the recorder, the combination comprising:
- a dust shield releasably secured to a periphery of said door and extending from said periphery of said door across and beyond said gap to said top surface of said recorder,
- said shield defining an open area within the periphery of said shield through which one may observe the tape behind said door,
- said shield being releasably secured to said door by POST-IT type adhesive,
- said shield comprising a rectangular frame, and
- said adhesive being applied to said shield only along an area adjacent the inner periphery of said shield.

3. A top loading video and audio cassette recorder having a transparent door formed in a top surface thereof which is raised with respect to the top surface of the recorder to insert a tape therein and forming a gap between the door and the top surface of the recorder, the combination comprising:
- a dust shield releasably secured to a periphery of said door and extending from said periphery of said door across and beyond said gap to said top surface of said recorder,
- said shield defining an open area within the periphery of said shield through which one may observe the tape behind said door,
- said shield being releasably secured to said door by POST-IT type adhesive,
- said shield comprising a rectangular frame,
- said adhesive being applied to said shield only along an area adjacent the inner periphery of said shield, and
- said shield being made of a material selected from the group consisting of cardboard, stiff paper and plastic.

* * * * *